United States Patent [19]

Yazaki

[11] Patent Number: 4,595,030

[45] Date of Patent: Jun. 17, 1986

[54] FUEL TANK FOR A WATER CRAFT

[75] Inventor: Mitsuhiro Yazaki, Kakogawa, Japan

[73] Assignee: Kawasaki Jukogyo Kabushiki Kaisha, Kobe, Japan

[21] Appl. No.: 704,204

[22] Filed: Feb. 22, 1985

[30] Foreign Application Priority Data

Mar. 2, 1984 [JP] Japan .................... 59-30741[U]

[51] Int. Cl.[4] ................ B01D 17/032; B65D 25/54
[52] U.S. Cl. ........................... 137/203; 137/172; 137/559; 137/590; 210/533; 210/534; 220/82 R; 220/DIG. 6
[58] Field of Search ............ 280/5 R, 5 SA; 137/172, 137/173, 546, 203, 559, 544, 590; 440/88; 114/198; 220/82 R, 1 C, DIG. 6; 210/534, 535, 536, 533

[56] References Cited

U.S. PATENT DOCUMENTS

| | | | |
|---|---|---|---|
| 267,190 | 11/1882 | Goldner ........................ | 210/534 |
| 1,157,643 | 10/1915 | Kuhn ........................... | 137/546 |
| 1,613,507 | 1/1927 | Feely ........................... | 210/534 |
| 1,641,076 | 8/1927 | Ferguson ...................... | 137/590 |
| 1,683,021 | 9/1928 | Brown ....................... | 137/590 X |
| 1,828,040 | 10/1921 | Hahm ....................... | 210/533 X |
| 2,002,407 | 5/1935 | Lemke ......................... | 210/533 |
| 2,204,998 | 6/1940 | Ryan ........................ | 137/172 X |
| 2,325,925 | 8/1943 | Waugh ...................... | 137/172 X |
| 3,722,529 | 3/1973 | Arakawa ...................... | 137/546 |
| 3,774,803 | 11/1973 | Bambardier ................ | 280/5 A X |
| 3,948,206 | 4/1976 | Tyler ......................... | 440/88 X |
| 3,987,294 | 10/1976 | Carlson ..................... | 280/5 A X |
| 4,133,287 | 1/1979 | Downs .................... | 220/82 R X |
| 4,166,431 | 9/1979 | Pickering ................. | 220/82 R X |
| 4,492,250 | 1/1985 | Ohmori et al. ................ | 137/590 |

FOREIGN PATENT DOCUMENTS

| | | | |
|---|---|---|---|
| 679269 | 2/1964 | Canada ...................... | 220/82 R |
| 2528030 | 1/1977 | Fed. Rep. of Germany ...... | 137/192 |
| 3202745 | 8/1983 | Fed. Rep. of Germany ...... | 210/536 |
| 123844 | 12/1927 | Switzerland ................ | 210/534 |
| 1009914 | 4/1983 | U.S.S.R. .................... | 220/82 R |

*Primary Examiner*—Allan N. Shoap
*Attorney, Agent, or Firm*—Marshall, O'Toole, Gerstein, Murray & Bicknell

[57] ABSTRACT

A fuel tank comprising a wall forming a main container for fuel, and a lateral extension from said main container. The extension is located adjacent the bottom of the main container, and the extension has at least one tranparent or translucent wall so that any water accumulated at the bottom of the tank and in the extension may be visibly detected.

7 Claims, 7 Drawing Figures

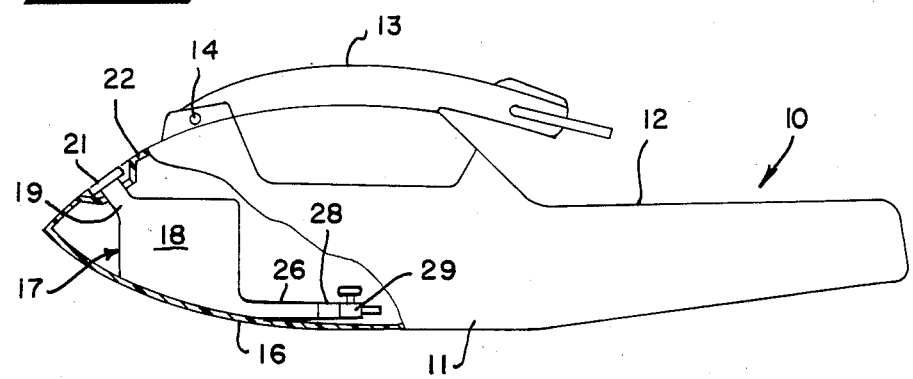
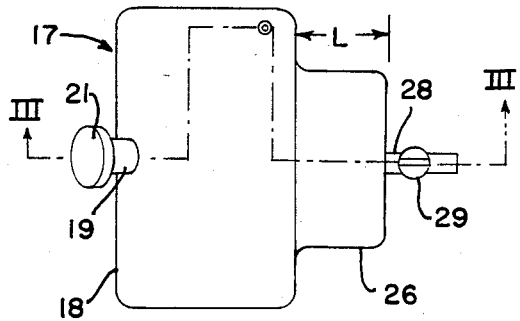
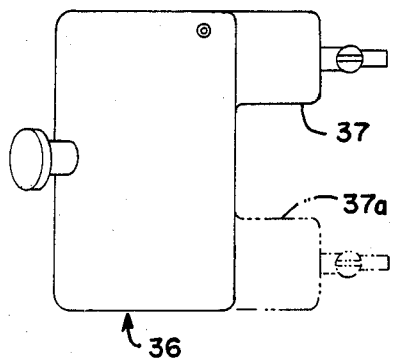
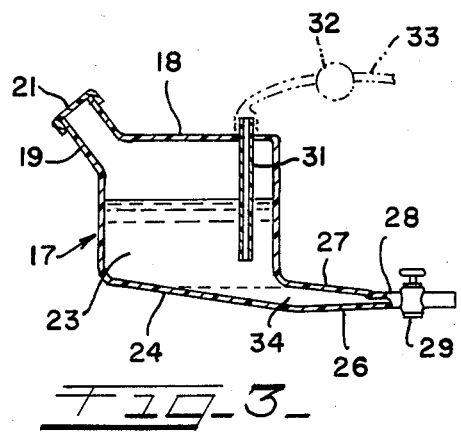
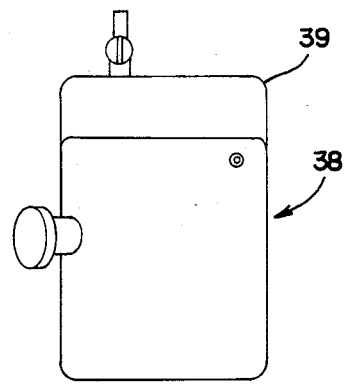

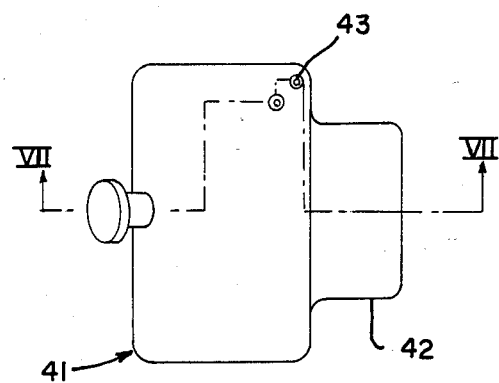
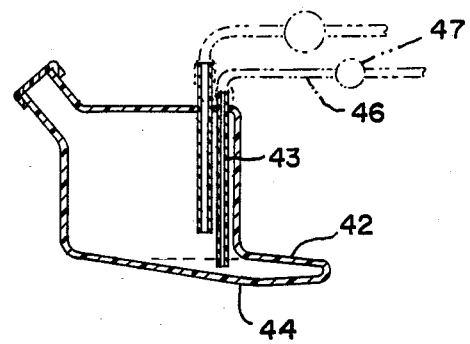

FUEL TANK FOR A WATER CRAFT

FIELD AND BACKGROUND OF THE INVENTION

The present invention relates to a fuel tank for an engine, particularly an engine of a small boat.

Relatively small recreational boats or water crafts have become increasingly popular in recent years. A well known type includes a hull having a small deck where an operator stands or sits during use. A small internal combustion engine is mounted within the hull and powers a water jet propulsion system. A fuel tank for the engine is also mounted within the hull adjacent the engine. The operator controls the boat by means of a movable control arm or handle.

It has been known that water enters the tank of such a boat because it is charged with fuel while the boat is moored at a pier, and the boat is often overturned when it is operated. It has been possible for a person to detect the existence of water in a prior art fuel tank only by inspecting the bottom of the fuel filter container of the engine, or by experiencing a failure of the engine. As a result, such an engine has sometimes stopped while the boat was being driven.

It is a general object of this invention to provide a novel and improved fuel tank, which avoids the foregoing problems.

BRIEF SUMMARY OF THE INVENTION

A fuel tank in accordance with the present invention comprises a wall forming a main container for fuel, and a lateral extension from said main container, the extension being located adjacent the bottom of the main container. The extension has at least one transparent or translucent wall so that any water accumulated at the bottom of the tank may be visibly detected.

BRIEF DESCRIPTION OF THE DRAWINGS

The invention will be better understood from the following detailed description taken in conjunction with the accompanying drawings, wherein:

FIG. 1 is a side view partially in section of a boat including a fuel tank in accordance with a first embodiment of the invention;

FIG. 2 is a top view of the fuel tank shown in FIG. 1;

FIG. 3 is a sectional view taken on the line III—III in FIG. 2;

FIGS. 4–6 are top views similar to FIG. 2 but showing fuel tanks according to second, third and fourth embodiments of the invention; and FIG. 7 is a sectional view taken on the line VII—VII in FIG. 6.

DETAILED DESCRIPTION OF THE DRAWINGS

With reference first to FIG. 1, a small boat 10 includes a hull 11 having a deck 12 where an operator (not shown) normally stands or sits. A control handle or arm 13 is pivotally attached to the hull 11 by a shaft 14 and is held by an operator during use. The hull 11 includes a bottom wall 16 which supports an engine (not shown) and a fuel tank 17 for the engine.

The fuel tank 17 includes a fuel container or storage part 18 and a fuel inlet pipe 19 which is normally closed by a cap or closure 21. The container part 18 is supported on the bottom wall 16 near the front of the boat, and the pipe 19 extends upwardly through a hole in the upper wall 22 of the hull.

With reference to FIGS. 1–3, the tank 17 contains fuel 23 in the container part 18, and the tank is at least partially made of a transparent or translucent material such as synthetic resin. The bottom wall 24 of the tank 17 has a generally horizontal, relatively thin extension 26 formed on one side thereof, and in this embodiment the extension 26 is toward the rear of the hull. As shown in FIG. 3, the upper wall 27 of the extension 26 slopes down and away from the container part 18, and the bottom 24 slopes down and toward the extension 26. The extension 26 is provided with a water outlet tube 28 at its outer end, and a valve 29 is in the tube 28.

The tank 17 further has a fuel suction pipe 31 which is connected to a pump 32 and a fuel pipe 33.

The fuel 23 is normally amber colored or an even darker color if it is mixed with oil for use with a two-cycle engine. When water enters the tank 17 it collects at the bottom of the tank as indicated by the numeral 34, particularly in the extension 26, because it is heavier than the fuel and the extension 26 is at a lower level than the main part of the tank. At least enough of the tank is made of a transparent or translucent material so that any water 34 in the extension and/or in the lower side of the container part 18 may be visibly detected. The entire tank may be transparent or translucent or only the upper wall 27 of the extension. As the amount of the water 34 increases, the color of the liquid in the extension 26 becomes lighter and finally it is clear as seen through the upper wall 4 when the extension is filled with water.

For this purpose, the extension 26 should have a length L of preferably 3 cm or more, and a thickness of preferably 10-20 mm or more.

When the boat operator believes that there may be water in the tank 17, he removes a cover of the hull above the engine compartment and inspects the tank. If he detects water, he places a receptacle under the tube 28, opens the valve 29, and drains off the water 34.

In FIG. 4, the tank 36 is generally similar to the tank 17 except that it has a bottom extension 37 formed adjacent one of its right and left sides, and/or a bottom extension 37a adjacent the other side.

In FIG. 5, the tank 38 has a bottom lateral extension 39 formed on one of its right and left sides.

In FIGS. 6 and 7, the tank 41 has a bottom extension 42 similar to the extension 26 in FIGS. 1–3, but without a water outlet tube and valve. Instead, the tank 41 has a water suction pipe 43 with its lower end adjacent the bottom 44 of the tank and the extension 42. The upper end of the pipe 43 is connected through a pipe 46 to a manual pump 47 to suck the water from the bottom side of the tank.

The tank may otherwise be made of metal or some other opaque material, except for the part, such as a wall of the extension, which is transparent or translucent.

What is claimed is:

1. A fuel tank comprising a main container part, said container part including a bottom portion, and said container part including an extension defining a collection chamber which extends laterally from said container part, said extension including an upper wall which slopes downwardly, and at least part of said upper wall being made of a transparent or translucent material, a portion of said upper wall adjacent said container part being above said bottom portion and part of said bottom portion extending to form the bottom wall of said extension.

2. A fuel tank according to claim 1, wherein said bottom portion comprises a bottom wall sloping down toward said extension.

3. A fuel tank according to claim 1, wherein said extension has an outlet port formed thereon.

4. A fuel tank according to claim 1, and further comprising a suction pipe extending into said tank and having its lower end adjacent said bottom portion.

5. A fuel tank comprising side walls, a top wall and a bottom wall forming a main container part, and an extension part forming a collection chamber including at least an upper wall and a bottom wall, said walls of said extension part being connected to one of said side walls and said bottom wall of said main container part and forming an extension volume which is at a lower level than the volume of said main container part, a portion of said upper wall of said extension part adjacent said main container part being above the bottom wall of said main container part and at least a portion of said bottom wall of said extension part adjacent said main container part being lateral of said one side wall and said bottom wall of said main container part, at least a portion of said walls of said extension part being transparent or translucent, and draining means for draining liquid from said extension part, said draining means extending generally laterally from a lower portion of said extension part.

6. A fuel tank according to claim 5, wherein said upper wall of said extension part is transparent or translucent.

7. A fuel tank according to claim 5, wherein said draining means comprises a drain pipe and a control valve connected to said walls of said extension part.

* * * * *